Patented Feb. 7, 1950

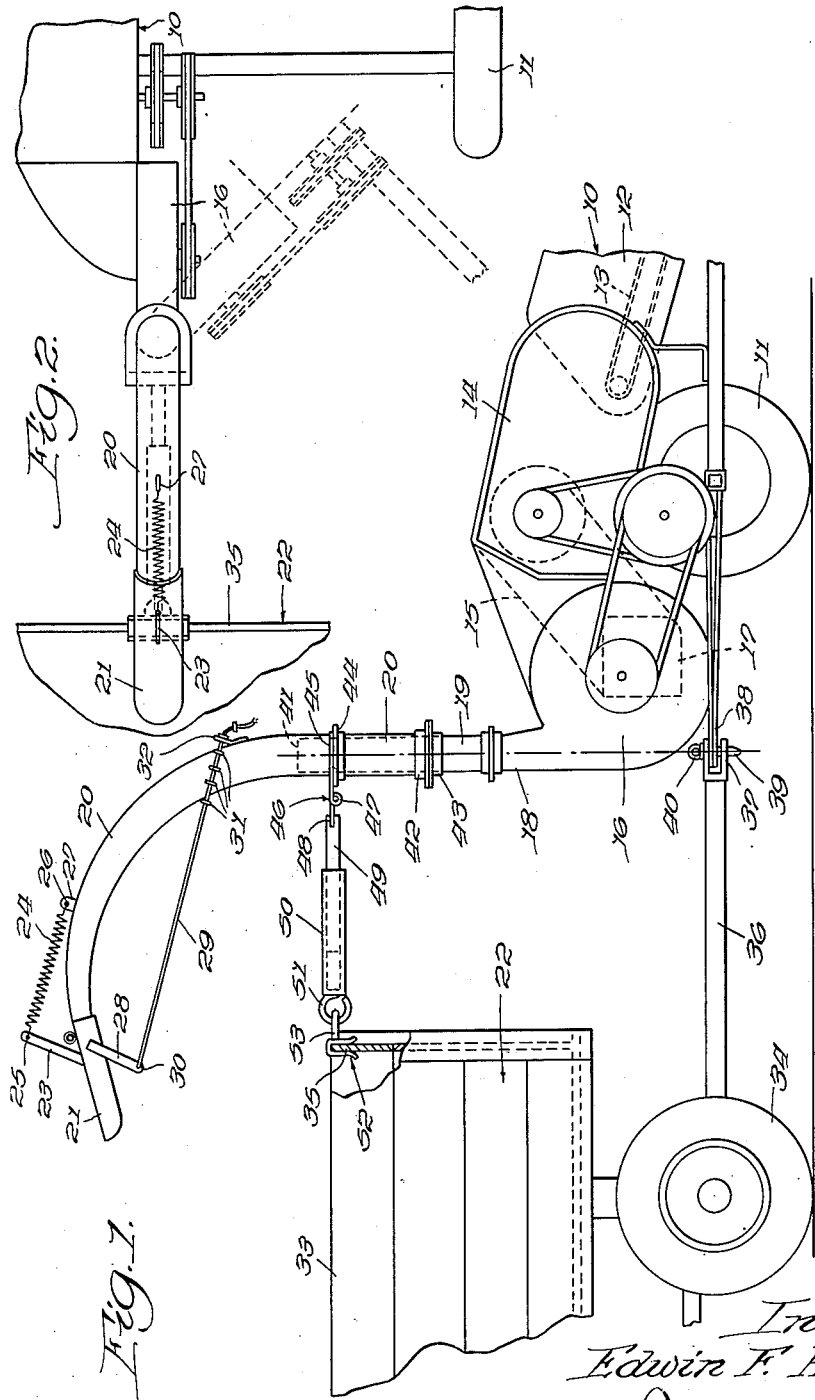

2,496,472

UNITED STATES PATENT OFFICE 2,496,472

BLOWER FOR HAY CHOPPERS

Edwin F. Huddle, Elmwood Park, Ill., assignor to International Harvester Company, a corporation of New Jersey Application October 1, 1945, Serial No. 619,575

3 Claims. (Cl. 214—42)

This invention relates to a new and improved blower for hay choppers and has for one of its principal objects the provision of means for maintaining the discharge portion of the blower directed toward a trailing wagon.

Field hay choppers are equipped with a blower at the rear thereof for the purpose of elevating the cut hay and thereupon discharging the hay into a trailing wagon. Heretofore, the wagon elevating blower mechanisms have been a rigid and fixed part of the hay chopper, and hence when the machine would turn corners the hay would be discharged at a point to one side of the trailing wagon box losing a considerable quantity of hay during the cutting of the entire field. It is therefore an important object of this invention to provide a blower forming part of a field hay chopping machine and a discharge portion of the blower being connected to a trailing wagon to insure discharge of the chopped hay into the wagon during all operations of the hay chopper.

Another important object of this invention is to provide a hay chopper or other agricultural implement having a wagon elevator or blower, the discharge portion of which is hingedly attached axially of the hitch connection between the implement and the trailing wagon.

A still further important object of this invention is to provide an attachment between the discharge portion of a wagon elevator and the trailing wagon in such a manner as to prevent lateral movement of the discharge portion of the elevator, but to permit fore and aft movement of the elevator whether it be on a straight line or angular movement.

Other and further important objects of this invention will become apparent from the disclosures in the following specification and accompanying drawings, in which:

Figure 1 is a side elevational view of a field hay chopper and an attached trailing wagon; and Figure 2 is a top plan view of a portion of the device as shown in Figure 1.

As shown in the drawings:

The reference numeral 10 indicates generally a field hay chopper which is adapted to pick up hay previously cut, or to cut hay and pick it up and thereupon chop the hay into relatively small particles and feed it to a wagon elevator at the rear of the machine. The hay chopper is mounted on wheels 11. The forward portion of the hay chopper includes a scoop-type platform 12, the front portion of which is broken away. The platform 12 has mounted thereon a rearwardly running conveyor 13 adapted to carry the hay, whether it be dry or green, upwardly and rearwardly into a cutting chamber 14 from which it discharges downwardly and rearwardly through the conduit 15 leading into a blower 16 having a side opening 17. The blower 16 houses a fan, not shown, running in a clockwise direction, as viewed in Figure 1, causing the hay entering the opening 17 to be thrown and blown upwardly through the discharge conduit 18. The chopped material continues up an extension 19 of the discharge conduit 18 and thereupon to a curved wagon discharge portion 20. The wagon discharge portion 20 has a deflecting hood 21 for the purpose of causing the chopped hay to be fed to any portion of a trailing wagon 22.

The deflecting hood 21 is equipped with an integral arm 23 extending upwardly and forwardly. A spring 24 is attached to the upper end of the arm 23 at 25 and at its other end is attached at 26 to a lug 27 projecting upwardly from a spaced point forwardly on the discharge portion 20 of the chopped hay wagon elevator. A second arm 28 is attached to the hood 21 and extends rearwardly and downwardly. A cable 29 is attached at 30 to the lower end of the arm 28 and extends forwardly to a position where an operator may pull forwardly thereon to effect a lowering of the deflecting hood 21, overcoming the action of the spring 24 which normally tends to maintain the deflecting hood in its uppermost position. The cable 29 is equipped with a plurality of stops 31 at various intervals along the length thereof and these stops are engageable in a notch, not shown, in a bracket 32 fixedly attached to the wagon discharge portion 20 of the wagon elevator by means of welding or riveting or the like. It will be apparent that an operator may shorten the length of the cable 29 by pulling forwardly thereon and engaging a different stop 31 in the notched bracket 32 and thus cause a deflection of chopped hay to a forward point of the trailing wagon 22.

The trailing wagon 22 is equipped with a box portion 33, a forward wheel truck 34, and a rear wheel truck, not shown. The box portion 33 has a forward or front side shown at 35. The wagon 22 has a forwardly extending tongue 36 having a forwardly open clevis 37 for telescopic engagement with a draw-bar 38 extending rearwardly from the hay chopper. The clevis 37 and the draw-bar 38 are equipped with vertically alined holes to receive a locking or hitch pin 39 having an enlarged head 40 which rests on the top of the clevis 37.

As stated in the objects above, wagon elevator blowers of this type were normally entirely mounted on the operating implements, such as a hay chopper, and were entirely free of the trailing wagon. Such a construction obviously discharged chopped hay at a point to the side of the trailing wagon whenever the implement would be turned. The reason is that the discharge or spout portion of the wagon elevator would be swung to a point beyond the side walls of the wagon box. In order to overcome this difficulty, the discharge portion 20 of the wagon elevator blower is equipped with a connection to the trailing wagon 22 so that the discharge spout constantly maintains its discharge direction with respect to the trailing wagon and not with respect to the position of the pulling hay chopper. It will be noted in Figure 1 that the pipe 19 extends upwardly and telescopes within the pipe 20 to a point indicated by the numeral 41. The outer pipe 20 is journally mounted for rotation in a cup-like journaling member 42 rigidly attached to the pipe 19 at 43. With this construction it is possible for the discharge portion 20 of the wagon elevator to move separately from the stationary discharge conduit 19.

A ring 44 is provided around the circumference of the pipe 20 at about the level of the top of the wagon box 33. A U-shaped clamp 45 is welded or otherwise attached to the upper surface of this ring 44 and projects rearwardly as a part of a hinge 46, the hinging axis of which is at 47. A rearwardly extending hinge portion 48 supports a piston-like element 49 adapted to telescope within a sleeve 50. The sleeve 50 has a hook portion at the rear thereof at 51 and in turn carries an inverted U-shaped bracket 52 by a forwardly extending arm 53. This inverted U-shaped bracket 52 fits over the top of the front wall 35 of the trailing wagon box. The connection between the hook 51 and the forwardly extending arm 53 of the inverted U-shaped member 52 acts as a hinge for the sleeve member 50 for movement in a vertical plane. The hinge 46 limits movement of the piston 49 to a vertical plane and thus it will be seen that lateral or side movement of the wagon elevator or blower is not permitted. When the hay chopper is being operated over rough terrain, it is possible for the hay chopper to have angular movement through a vertical plane with respect to the trailing wagon, and to control such movement the telescoping members 49 and 50 are incorporated in the connection between the hay chopper and the trailing wagon. The hinge 46 at the fore and aft of this attachment and the hinge between the elements 51 and 53 at the rear end combine to permit buckling of the hay chopper and trailing wagon so that the elements 49 and 50 are more or less telescoped.

The center line of swivel movement for the pipe 20 within the cup 42, or for movement of the cup 42 around the pipe 20, is an upward extension of the approximate center line through the hitch pin 39. As the hay chopper 10 is turned at the end of the field or whenever it is necessary to make a turn, the blower 16 has its angular relationship with respect to the trailing wagon 22 changed, as shown in the dashed line portion of Figure 2. Figure 2 shows the hay chopper in full lines in a straight away position and in the dashed lines shows the hay chopper being turned prior to the time when the trailing wagon also begins turning. Inasmuch as the vehicles are hitched axially of the vertical swiveling discharge blower, it is possible by means of the telescopic members 49 and 50 to maintain the discharge portion 20 of the wagon elevator blower fixed with respect to the angular position of the trailing wagon 22. In other words, the discharge portion 20 of the wagon elevator blower remains fixed with the wagon while the hay chopper and its integral blower journally rotates within this discharge portion 20 of the blower.

Numerous details of construction may be varied throughout a wide range without departing from the principles disclosed herein, and I therefore do not propose limiting the patent granted hereon otherwise than as necessitated by the appended claims.

What is claimed is:

1. A field traversing farm implement having a trailing wagon hingedly hitched thereto, a vertically disposed device for elevating crops treated by said farm implement, a discharge portion connected to said elevating device for delivering the crop into the trailing wagon, means for continuously directing said discharge portion into said trailing wagon, said means including a swivel connection between said vertically disposed elevating device and its discharge portion in vertical axial alinement with said wagon hinge hitch, and a connector joining said trailing wagon and the discharge portion of said elevating device for vertical hinging movement and for maintaining the same lateral angular position of the trailing wagon and discharge portion.

2. A field traversing farm implement and a trailing wagon, a hitch between said implement and said wagon having horizontal swinging movement, a blower mounted on said implement and having an upwardly extending discharge pipe, a cup-like member fixedly attached to said discharge pipe, an extension conduit having one end journaled in said cup-like member and forming a swivel connection, the center line of said swivel connection being axially alined with said hitch, said extension member having a rearwardly extending part and the other and discharge end thereof terminating over said trailing wagon, and means for maintaining said discharge end of the extension member in fixed lateral relationship with respect to said trailing wagon, said means including a pair of telescopic members one of which is hinged for vertical hinging with respect to said conduit and the other of which is hinged for vertical hinging with respect to said trailing wagon.

3. A field traversing farm implement and a trailing wagon, a hitch joining said farm implement and said wagon and having horizontal swinging movement, a blower having an upwardly extending pipe for discharging material from said blower, a cup-like member fixedly attached to said pipe at the upper end thereof, an extension conduit having one end journaled in said cup-like member and forming a swivel connection, the approximate center line of said swivel connection being axially alined with said hitch, said extension conduit having its other end extending rearwardly over said trailing wagon and link means hinged to the trailing wagon and said extension conduit for vertical swinging movement for maintaining the rearwardly extending end of the extension conduit in fixed lateral relationship with respect to said trailing wagon, said means permitting angular vertical change in relationship between the blower pipe and said trailing wagon, whereby the extension conduit will continuously discharge in said trailing wagon.

EDWIN F. HUDDLE.

REFERENCES CITED

The following references are of record in the file of this patent:

UNITED STATES PATENTS

| Number | Name | Date |
| --- | --- | --- |
| Re. 22,697 | McEachern | Nov. 27, 1945 |
| 668,141 | Dingee | Feb. 12, 1901 |
| 1,197,345 | Clevin et al. | Sept. 5, 1916 |
| 1,295,520 | Kepler | Feb. 25, 1919 |
| 1,952,691 | Surdykowski | Mar. 27, 1934 |
| 1,953,235 | Kelley | Apr. 3, 1934 |
| 2,196,025 | Paradise et al. | Apr. 2, 1940 |
| 2,343,153 | Miller | Feb. 29, 1944 |
| 2,377,760 | Court | June 5, 1945 |